Figure 1:
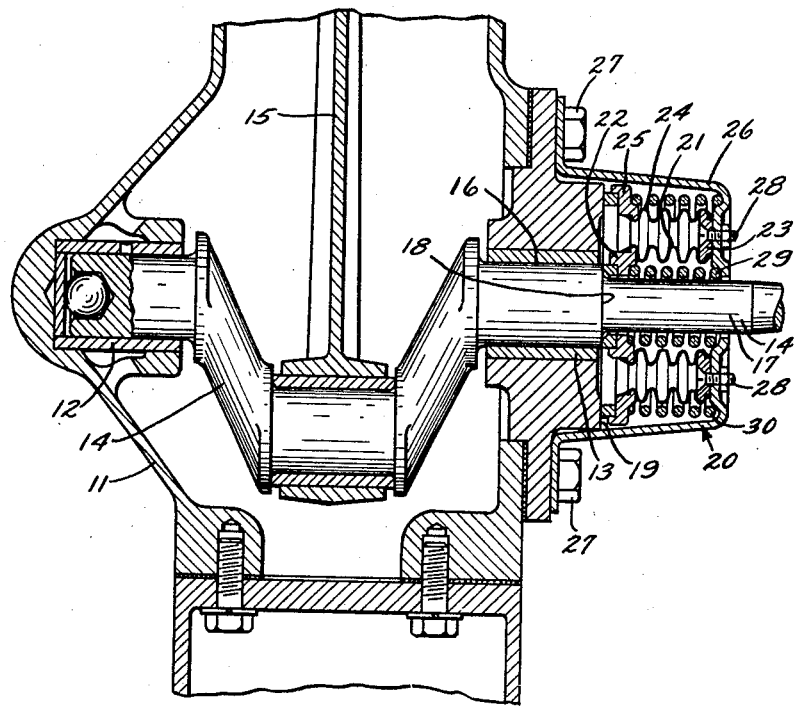

Dec. 3, 1929.                C. C. SPREEN                1,737,777
                          JOURNAL BEARING SEAL
                          Filed Dec. 30, 1926

CHARLES C. SPREEN
Inventor
By Smith and Freeman
Attorneys

Patented Dec. 3, 1929

1,737,777

UNITED STATES PATENT OFFICE

CHARLES C. SPREEN, OF DETROIT, MICHIGAN

JOURNAL-BEARING SEAL

Application filed December 30, 1926. Serial No. 157,940.

Figure 2:
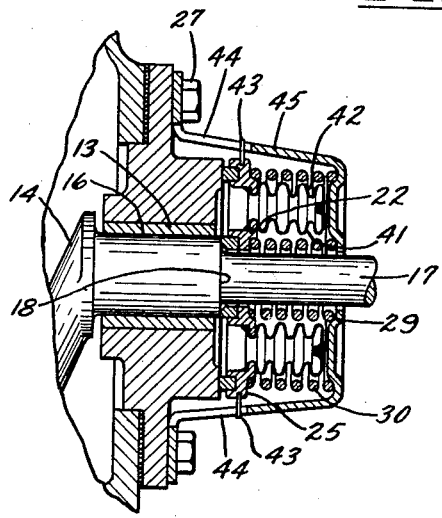

My invention relates to gas tight seals for journal bearings, and particularly to means for sealing the drive shaft aperture in the casing of a refrigerant compressor, and the principal object of my invention is to provide new and improved means for this purpose. In the drawings accompanying this specification and forming a part of this application I have shown, for purposes of illustration, one form which my invention may assume, and in these drawings:

Figure 1 is a fragmentary central vertical section through a compressor showing the embodiment of my invention herein disclosed, while Figure 2 is a fragmentary view showing a modification possible with this form of my invention.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15. The crank shaft projects beyond the open-end bearing 13 through a suitable aperture 16 in the casing 11, and is provided exteriorly of the casing 11 with a reduced extension 17 forming an annular shoulder 18 and adapted to receive a suitable driving connection, not shown; and the casing 11 is provided with an annular casing seat 19 surrounding the aperture 16 and the crank shaft 14 passing therethrough.

Closing the aperture 16, particularly to prevent the egress of refrigerant and the ingress of moisture, is a seal 20 shown in figure 1 as comprising a substantially tubular flexible bellows 21 corrugated to increase its flexibility, having its inner end attached to a base 22 adapted to be held in sealing engagement with the shoulder 18, and having its outer end attached to a base 23; a second substantially tubular flexible bellows 24 corrugated to increase its flexibility, having its inner end attached to a base 25 adapted to be held in sealing engagement with the casing seat 19, and having its outer end attached to the base 23; and a housing 26 enclosing the seal 20, secured to the casing 11 by means of suitable securing bolts 27, carrying the base 23 by means of suitable securing bolts 28, and forming a base for a pair of compression springs 29 and 30 serving to hold the bases 22 and 25 in sealing engagement respectively with the shoulder 18 and the casing seat 19. The bases 22 and 25 are provided with grooves on the side facing the casing for the reception of bearing rings 31 and 32. The rings are preferably formed of a self lubricating metal such as a graphite bearing bronze.

In Figure 2 I have shown a modification of my invention wherein the two bellows 21 and 24 are replaced by two bellows 41 and 42 directly united to each other, and wherein the seal is held against rotation by means of pins 43 projecting from the base 25 through slots 44 in a substitute housing 45.

From the above description it will be obvious to those skilled in the art that I have provided a seal readily removable as a unit merely by removing the securing bolts 27, but serving to tightly and securely seal the aperture 16, and under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

1. In a journal bearing seal, the combination of a casing provided with a shaft aperture, and with a seat encircling the axis of said aperture, a shaft passing through said aperture and provided with a seat, and a seal for said aperture comprising a resilient tubular bellows structure resiliently sealed at one end to said casing seat and resiliently and rotatably sealed at the other end to said shaft seat, the other of said sealed diaphragm ends being unattached relative to said casing seat.

2. In a journal bearing seal, the combination of a casing provided with a shaft aperture, and with a seat encircling the axis of said aperture, a shaft passing through said aperture and provided with an integral seat, and a seal for said aperture comprising a resilient tubular bellows structure formed as a tube telescoping on itself and resiliently sealed at one end to one of said seats and resiliently sealed at the other end to the other of said seats.

3. In a journal bearing seal, the combination of a casing provided with a shaft aperture, and with a seat encircling the axis of said aperture, a shaft passing through said aperture and provided with a seat, and a seal for said aperture fixed to said casing and comprising a resilient bellows structure formed as a tube telescoping on itself and sealed at one end to said casing seat and rotatably sealed at the other end to said shaft seat.

4. In a journal bearing seal, the combination of a casing provided with a shaft aperture, and with a seat encircling the axis of said aperture, a shaft passing through said aperture and provided with a seat, and a seal for said aperture fixed to said casing and comprising a telescopic resilient tubular bellows terminating at its two ends in two rigid bases resiliently sealed one to said casing seat and the other rotatably to said shaft seat.

5. In a journal bearing seal, the combination of a casing provided with a shaft aperture, and with a seat encircling the axis of said aperture, a shaft passing through said aperture and provided with an integral seat, and a seal for said aperture comprising a resilient bellows formed as a tube reversed on itself, fixed to said casing at the point of reversal and terminating at its two ends in two rigid bases resiliently sealed one to one of said seats and the other to the other of said seats.

6. In combination with a casing having a plate provided with a shaft aperture and with a seat encircling the axis of said aperture, and a shaft extending through said aperture and provided with a seat externally thereof; of a seal structure for said aperture, comprising a telescopic bellows, bearing rings secured to the free ends of said bellows, said bearing rings engaging the seat on said casing and the seat on said shaft, and resilient means for sealing said bearing rings against said seats.

In testimony whereof I hereunto affix my signature.

CHARLES C. SPREEN.